United States Patent
Gokhale et al.

(10) Patent No.: US 6,774,758 B2
(45) Date of Patent: Aug. 10, 2004

(54) LOW HARMONIC RECTIFIER CIRCUIT

(76) Inventors: Kalyan P. Gokhale, 4595 S. Delphine Dr., New Berlin, WI (US) 53151; Alpo K. Vallinmäki, S. 52 W. 30969 Old Village Rd., Mukwonago, WI (US) 53149; Nicklas Jan Anders Sodo, Jämeräntaival 10 A 6, 02150 Espoo (FI)

( * ) Notice: Subject to any disclaimer, the term of this patent is extended or adjusted under 35 U.S.C. 154(b) by 0 days.

(21) Appl. No.: 10/241,200

(22) Filed: Sep. 11, 2002

(65) Prior Publication Data

US 2004/0046633 A1 Mar. 11, 2004

(51) Int. Cl.[7] .............................................. H01F 27/27
(52) U.S. Cl. ...................... 336/234; 336/214; 336/184; 336/110; 336/178; 336/215; 363/17; 363/58; 363/48
(58) Field of Search ................................. 336/234, 214, 336/184, 110, 178, 215; 363/17, 58, 48

(56) References Cited

U.S. PATENT DOCUMENTS 5,251,120 A * 10/1993 Smith ........................ 363/44

* cited by examiner

Primary Examiner—Lincoln Donovan
Assistant Examiner—Jennifer A. Poker
(74) Attorney, Agent, or Firm—Michael M. Rickin, Esq.

(57) ABSTRACT

Non-linear inductor(s) are used to reduce the percent total harmonic distortion of the harmonics in the line currents in the input side rectifier system of an ac drive system. Several constructions for the non-linear inductor(s) are described. The non-linear inductor(s) may be constructed from E and I laminations. The gap depends on the construction of the middle leg of the E laminations and may have a step with a constant spacing or a variable spacing which depends on the stacking of the laminations. Alternatively the non-linear inductor(s) may be constructed from a toriodal core that either has a step gap or a variable type gap.

4 Claims, 9 Drawing Sheets

LOW HARMONIC RECTIFIER CIRCUIT

FIELD OF THE INVENTION

This invention relates to the input side rectifier in an ac drive system and more particularly to the inductors used therein.

DESCRIPTION OF THE PRIOR ART

The two main subsystems of a modern ac drive system are the input side rectifier system and output inverter system. The purpose of the rectifier system is to convert input ac voltage, from the utility source, into an intermediate dc voltage and the purpose of the inverter system is to convert the intermediate dc voltage into a variable frequency and a variable magnitude ac output voltage. The rectifier systems are also used in equipment such as welding, electroplating and uninterruptible power supplies.

The input rectifier system consists of a three-phase diode bridge, either ac or dc side inductor(s) and dc bus capacitors. The three-phase diode bridge converts input ac voltage into dc voltage. The inductor(s) and capacitor(s) serve as a smoothing filter for the intermediate dc voltage. Such a rectifier system, when connected to a sinusoidal voltage utility source, draws non-sinusoidal currents. These harmonic currents are not desirable because of their adverse effects (such as energy losses and malfunction of the sensitive equipment) on the utility network. Therefore, it is of commercial importance to reduce the harmonic currents produced by the rectifier systems.

The magnitudes of the harmonic currents are mainly dependent on the value of the ac or dc side inductors and on the average value of the load current on the dc side. Generally speaking, the level of the harmonic line currents commonly measured in percent total harmonic distortion (%THD) is lower if the value of the inductor is large. But the larger the value of the inductor, the bigger it is in size and the more expensive it is. Also the %THD increases as the load on the rectifier circuit is reduced from full load to partial load. Since ac drives operate at partial load for most of their operating time, it is important to minimize the %THD of a rectifier circuit at partial load.

The present invention reduces the %THD of the line current of a rectifier circuit by incorporating one or more non-linear inductor(s) in the ac or dc side of the rectifier circuits. Specifically, the invention reduces the %THD of the line current at partial loads when compared with rectifier circuits using conventional (linear) inductors. As an additional benefit, the invention also reduces current ripple stress on the filter capacitor at partial loads.

SUMMARY OF THE INVENTION

A system that has a rectifier having an input for connection to an ac source and an output; and an inductance-capacitance filter connected to the output of the rectifier where the inductance comprises one or more inductors designed to have an inductance that changes non-linearly over a predetermined range of operating current and harmonic currents drawn from said ac source both when a rated load and a partial load are connected to said rectifier that have a percent total harmonic distortion that is less than the percent total harmonic distortion when said inductance comprises one or more linear inductors.

A system that has a rectifier having an input for connection to an ac source and an output; one or more inductors designed to have an inductance that changes non-linearly over a predetermined range of operating current and harmonic currents drawn from said ac source both when a rated load and a partial load are connected to said rectifier that have a percent total harmonic distortion that is less than the percent total harmonic distortion when said inductance comprises one or more linear inductors connected between the input of the rectifier and the ac source; and a capacitor connected across the output of the rectifier.

A non-linear inductor that has a magnetic material tape wound toroidal core; and an air gap in the core having at least two widths.

DESCRIPTION OF THE PREFERRED EMBODIMENT(S)

Figure 1:
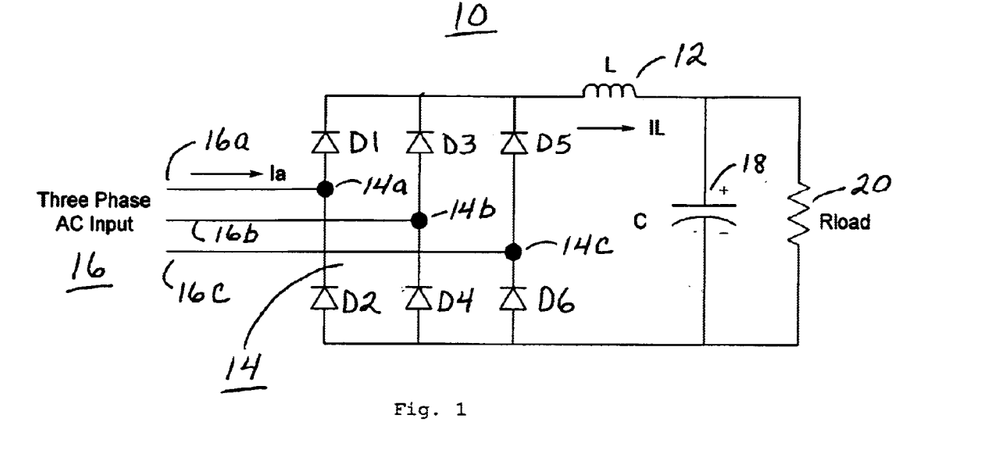
FIG. 1 shows a schematic for a three phase rectifier system that has a dc side filter inductor.

Referring now to FIG. 1, there is shown a three phase rectifier system 10 that has a dc side filter inductor 12 labeled as L. As is shown in FIG. 1, the system has bridge 14 connected directly to the three phases 16a, 16b and 16c of the ac input 16. Bridge 14 has six diodes D1 to D6. Input phase 16a is connected to diodes D1 and D2 at junction 14a, input phase 16b is connected to diodes D3 and D4 at junction 14b, and input phase 16c is connected to diodes D5 and D6 at junction 14c. Filter inductor 12 is connected between the cathode of each of diodes D1, D3 and D5 and one terminal of a capacitor 18, labeled as C, which is in parallel with load 20 represented in FIG. 1 by a resistor labeled Rload. The other terminal of capacitor 18 is connected to the anode of each of diodes D2, D4 and D6.

Figure 2:
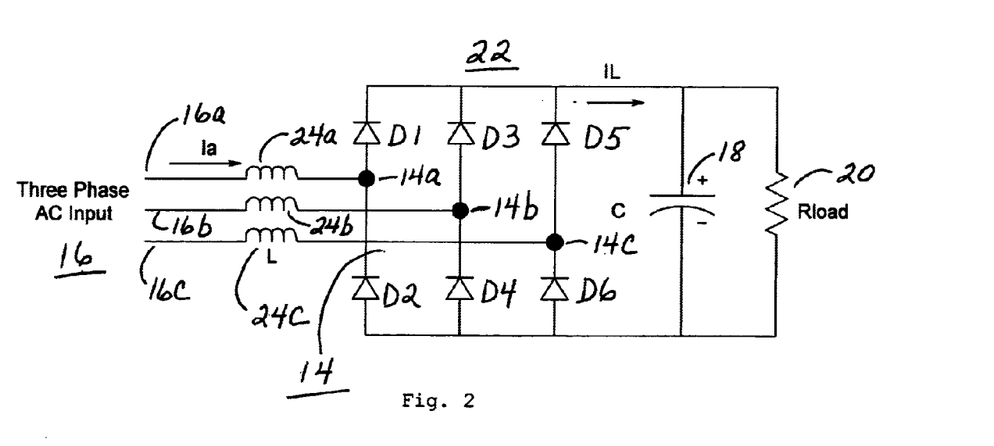
FIG. 2 shows a schematic for a three phase rectifier system that has an ac side filter inductor.

FIG. 2 shows a three phase rectifier system 22 in which bridge 14 is connected to the three phases of ac input 16 through three filter inductors 24a, 24b and 24c. Except for the difference in the location of the filter inductors, systems 10 and 22 are otherwise identical and therefore elements in FIG. 2 which have the same function as a corresponding element in FIG. 1 have the same reference numeral that is used in FIG. 1 for that element.

While the present invention is described below in connection with the rectifier system of FIG. 1, the description is equally applicable to the rectifier system of FIG. 2.

Figure 3:
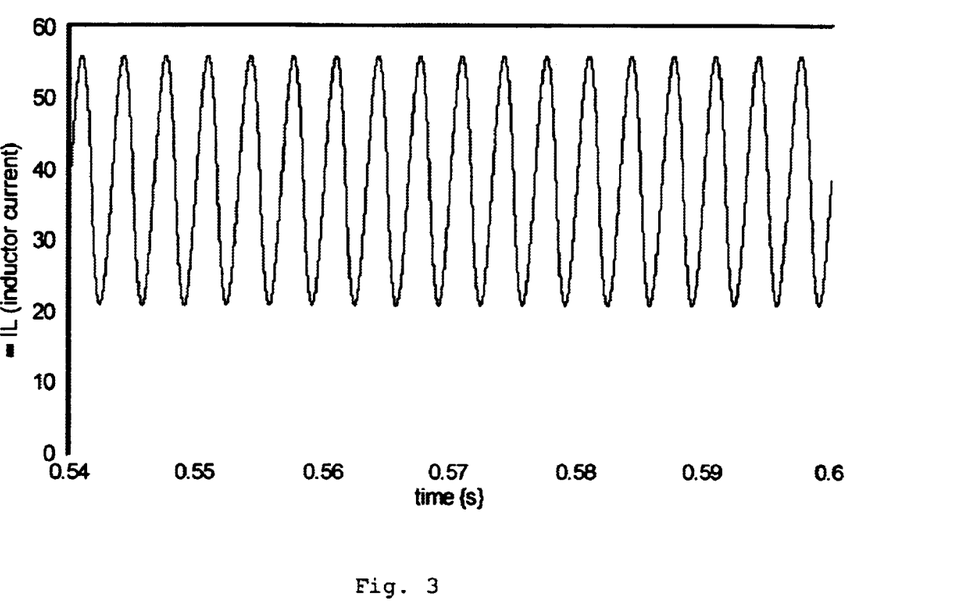
FIG. 3 shows the current through the inductor of the rectifier system of FIG. 1
Figure 4:
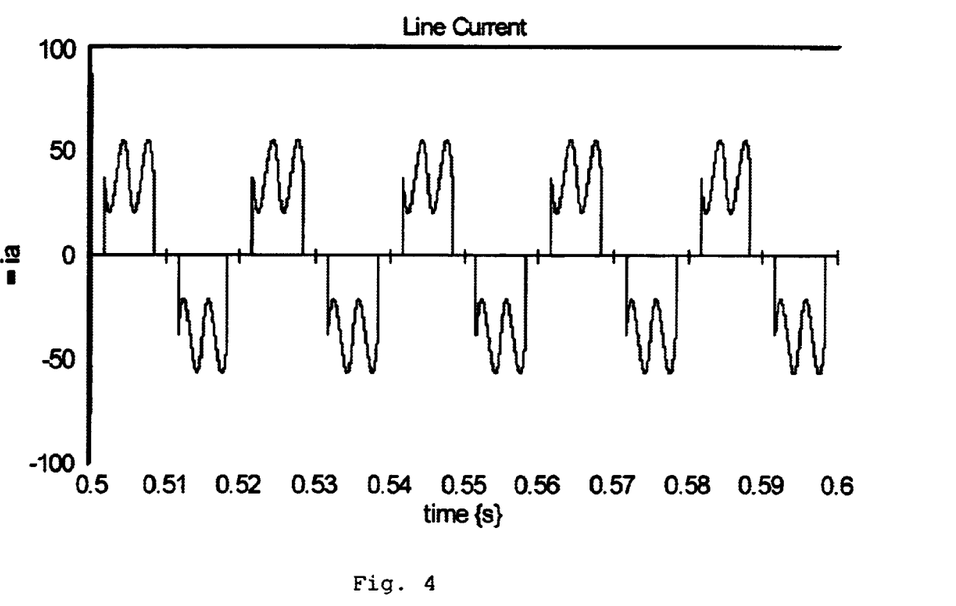
FIG. 4 shows the line current through phase A of that system with a linear inductor.

Referring now to FIGS. 3 and 4 there is shown in FIG. 3 the current, IL, through inductor 12 and in FIG. 4 the line current Ia of input phase 16a for a rectifier circuit that has a linear inductor. The inductance of a linear inductor is substantially constant as a function of the current flowing through it. As an example, the circuit component values are as follows:

Vin=400V rms at 50 Hz, line-to-line utility voltage

L=1100 $\mu$H

C=1150 $\mu$F

Rload=14 $\Omega$.

Table 1 below shows the harmonic content of the line current Ia in absolute values and as a percentage of the total rms current. The circuit is operating at the rated power level.

TABLE 1

| Harmonic Order | Harmonic Current (A) | % of RMS Current |
|---|---|---|
| Fundamental | 42.66 | 91.75 |
| $5^{th}$ | 13.86 | 29.80 |
| $7^{th}$ | 10.49 | 22.56 |
| $11^{th}$ | 3.84 | 8.27 |
| $13^{th}$ | 3.68 | 7.92 |
| $17^{th}$ | 2.49 | 5.36 |
| $19^{th}$ | 2.34 | 5.03 |
| RMS Current (A) | 46.50 A | |
| % THD | 39.78% | |

Figure 5:
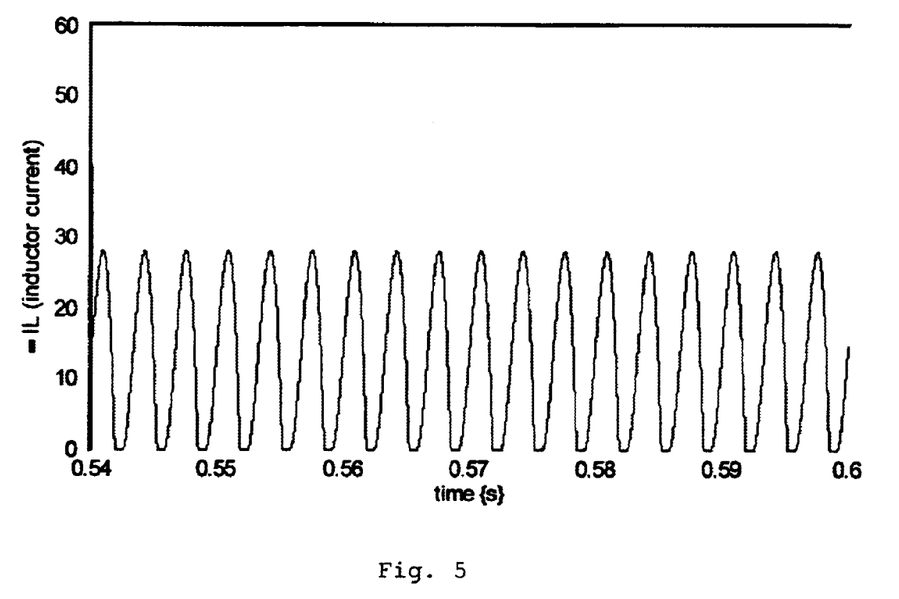
FIG. 5 shows the current through the inductor of the rectifier system of FIG. 1
Figure 6:
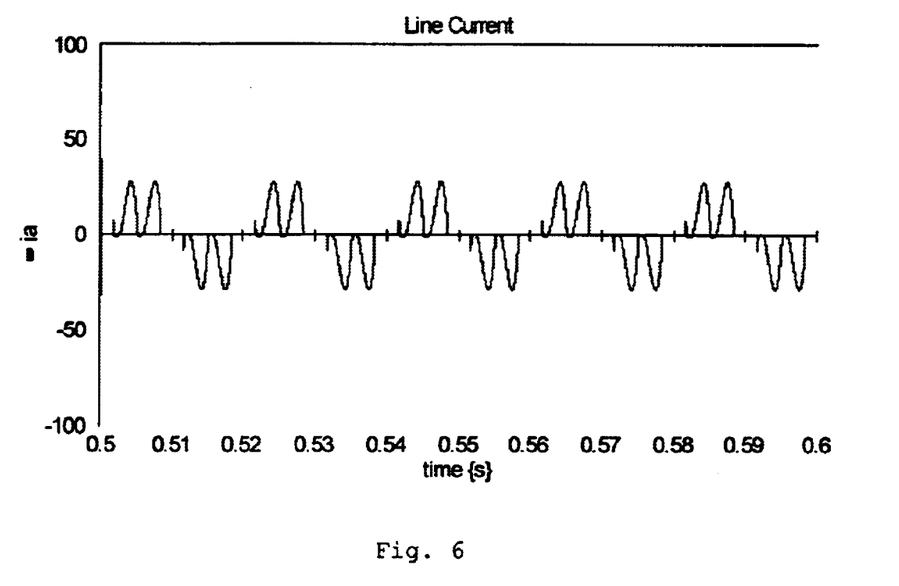
FIG. 6 shows the line current through phase A of that system with a linear inductor and the load on the system at only a predetermined percentage of the rated load.

Referring now to FIGS. 5 and 6 there is shown in FIG. 5 the current IL through the inductor 12 and in FIG. 6 the line current Ia of phase 16a for a rectifier circuit with a linear inductor but the load on the rectifier circuit is at 33% of the rated load, that is, Rload=42 $\Omega$. Table 2 below shows the harmonic content of the line current Ia in absolute values and as a percentage of the total rms current. The rectifier circuit is operating at a 33% power level.

TABLE 2

| Harmonic Order | Harmonic Current (A) | % of RMS Current |
|---|---|---|
| Fundamental | 14.69 | 76.12 |
| $5^{th}$ | 10.01 | 51.84 |
| $7^{th}$ | 7.10 | 36.81 |
| $11^{th}$ | 1.73 | 8.97 |
| $13^{th}$ | 1.35 | 6.98 |
| $17^{th}$ | 0.86 | 4.45 |
| $19^{th}$ | 0.74 | 3.85 |
| RMS Current (A) | 19.30 A | |
| % THD | 64.85% | |

A comparison of the harmonic data from Table 1 and Table 2 shows that when a linear inductor is used for inductor 12, there is a substantial increase in the percentage of harmonic currents at partial load when compared with the data at rated load.

Figure 7:
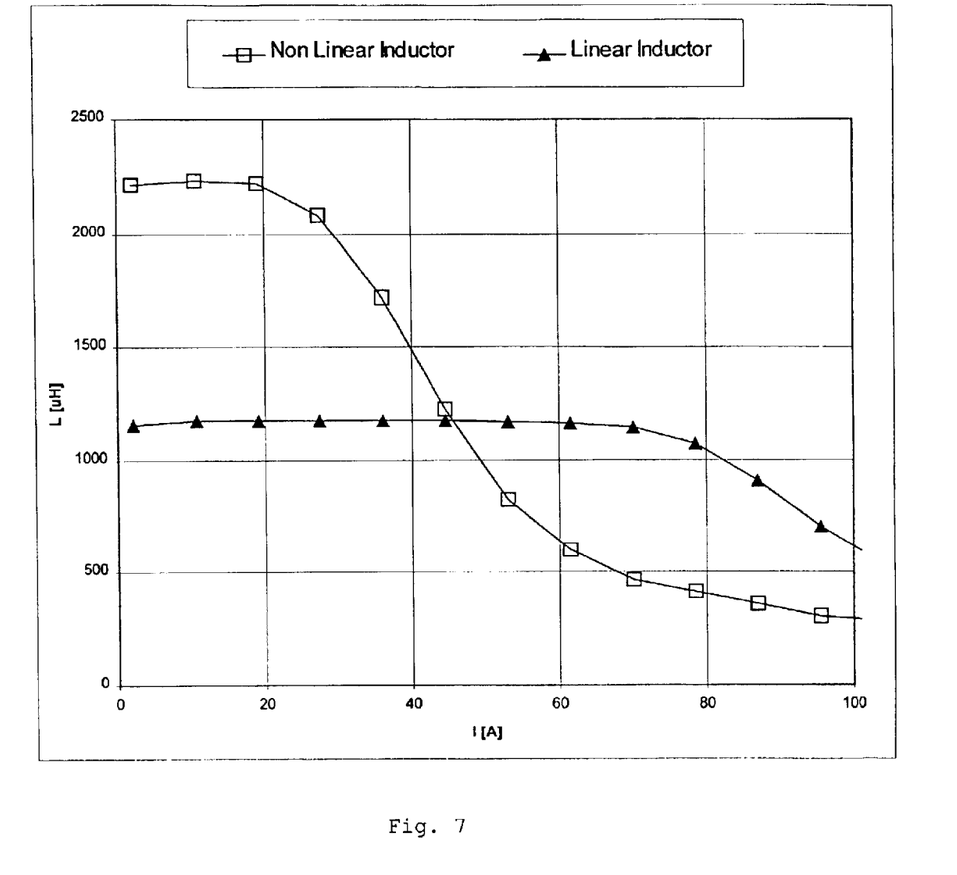
FIG. 7 shows inductance versus operating current curves for the linear and non-linear inductors.

Replacing the linear inductor by a nonlinear inductor can substantially reduce the harmonic current content of the line current of the rectifier circuit. The nonlinear (also called swinging choke) inductor has a higher value of inductance at lower currents but a lower value of inductance at higher current levels. FIG. 7 shows inductance versus operating current curves for the linear inductor and for the nonlinear inductor where the amount of core material (laminations) and the number of turns of the winding are identical in both inductors. The construction method for the nonlinear inductor is described below.

Figure 8:
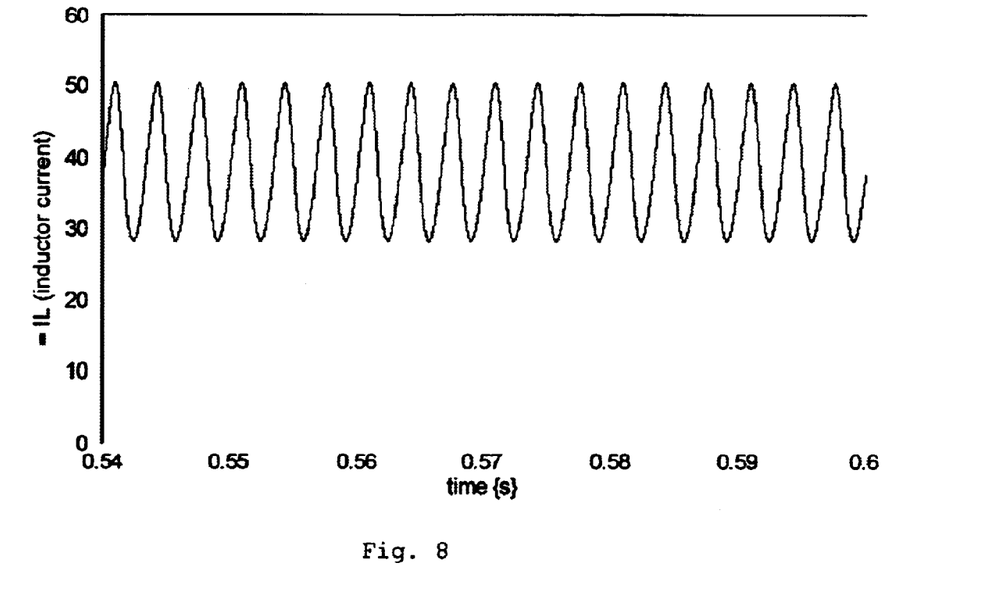
FIG. 8 shows the current through the inductor of the rectifier system of FIG. 1
Figure 9:
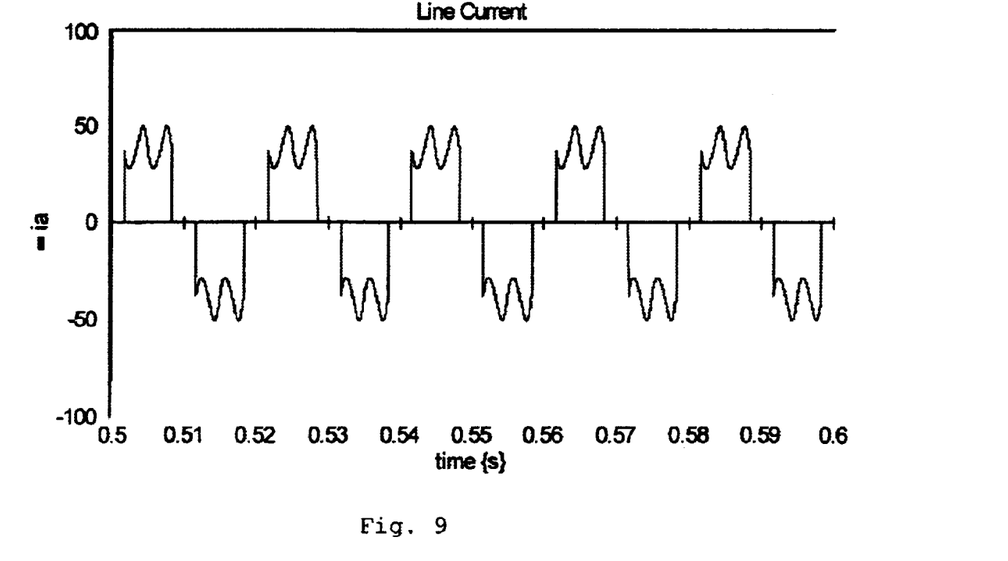
FIG. 9 shows the line current through phase A of that system with a non-linear inductor.
Figure 10:
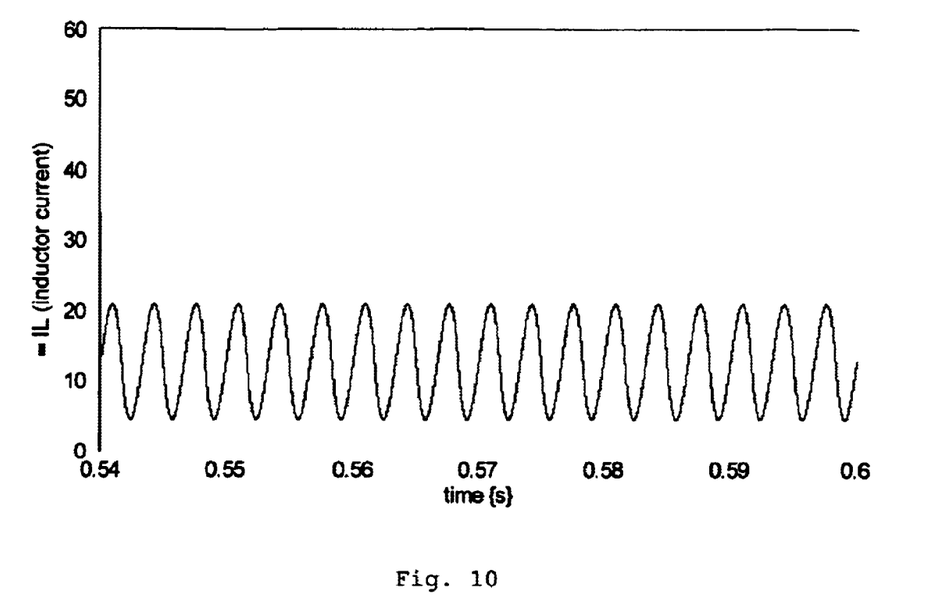
FIG. 10 shows the current through the inductor of the rectifier system of FIG. 1
Figure 11:
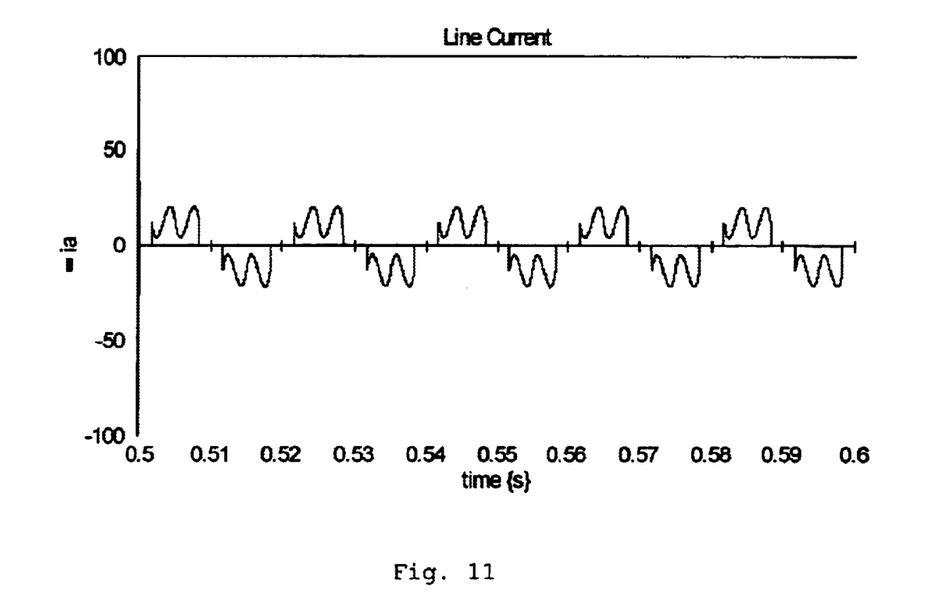
FIG. 11 shows the line current through phase A of that system with a non-linear inductor and the load on the system at only a predetermined percentage of the rated load.

FIGS. 8 and 9 show the inductor current IL and line current Ia of input phase 16a at rated load, respectively, with a dc side non-linear inductor. FIGS. 10 and 11 show the inductor current IL and line current Ia of input phase 16a at 33% load, respectively, with a dc side non-linear inductor. Tables 3 and 4, below, show the harmonic current data at rated load and at 33% load respectively.

TABLE 3

| Harmonic Order | Harmonic Current (A) | % of RMS Current |
|---|---|---|
| Fundamental | 42.51 | 94.16 |
| $5^{th}$ | 11.11 | 24.60 |
| $7^{th}$ | 8.27 | 18.31 |
| $11^{th}$ | 4.47 | 9.90 |
| $13^{th}$ | 2.99 | 6.62 |
| $17^{th}$ | 2.48 | 5.48 |
| $19^{th}$ | 2.09 | 4.64 |
| RMS Current (A) | 45.15 A | |
| % THD | 33.67% | |

TABLE 4

| Harmonic Order | Harmonic Current (A) | % of RMS Current |
|---|---|---|
| Fundamental | 14.88 | 88.86 |
| $5^{th}$ | 5.83 | 34.81 |
| $7^{th}$ | 4.51 | 26.94 |
| $11^{th}$ | 1.23 | 7.36 |
| $13^{th}$ | 1.36 | 8.14 |
| $17^{th}$ | 0.81 | 4.81 |
| $19^{th}$ | 0.80 | 4.78 |
| RMS Current (A) | 16.74 A | |
| % THD | 45.87% | |

A comparison of the harmonic data from Table 1 and Table 3 shows that when a non-linear inductor is used, the line harmonics at rated current are lower than the harmonic currents produced by the linear inductor. A comparison of harmonic current data from Table 2 and Table 4 shows that at partial load the non-linear inductor produces a substantially lower percentage harmonic currents than the linear inductor.

Figure 12:
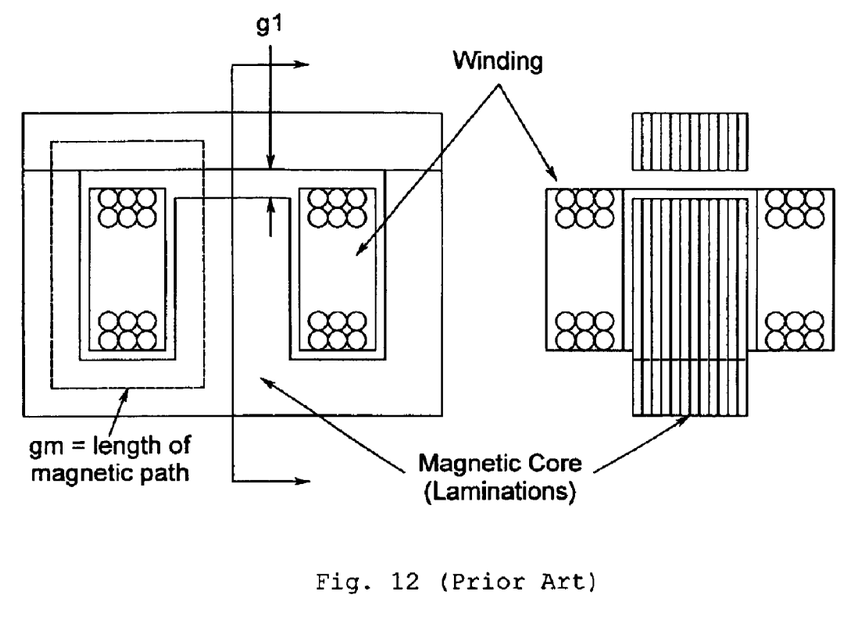
FIG. 12 shows one of the most commonly used construction techniques used to make a linear dc side inductor.

Referring now to FIG. 12, there is shown the most commonly used construction method to manufacture a linear dc side inductor. This method uses a stack of E and I type magnetic material laminations 30 and 32, respectively, and a winding 34 around the middle leg 30c of the E laminations. A constant width air gap g1 is introduced at the middle leg 30c of the E laminations. It is also possible to introduce an air gap in the two outer legs 30a, 30b of the E laminations. An approximate equation for the inductance value L of this type of the inductor is:

$$L \propto \mu_0 \frac{N^2}{\left(\frac{g l}{1} + \frac{g m}{\mu_r}\right)} \qquad \text{Eq. 1}$$

where:
  g1=air gap
  gm=magnetic path length in the laminations
  $\mu_0$=permeability of air
  $\mu_r$=relative permeability of lamination material
  N=number of turns in the winding.

Since the relative permeability of the lamination material, $\mu_r$, is quite high (greater than 1000) as compared with the relative permeability of the air (equal to 1) in the gap g1, the inductance value is inversely proportional to the width of air gap g1. In this type of design for a linear dc inductor, the value of the inductance is, as is shown in FIG. 7, fairly constant over the intended operating current range. The flux density in the laminations 30, 32 is below the saturation flux density level and the relative permeability of the lamination material $\mu_r$ is fairly high. At higher current levels, the laminations 30, 32 start saturating which means $\mu_r$ of the lamination material starts to rapidly decrease. Therefore, as seen from Eq. 1, inductance value also starts to decrease as shown in FIG. 7.

Figure 13:
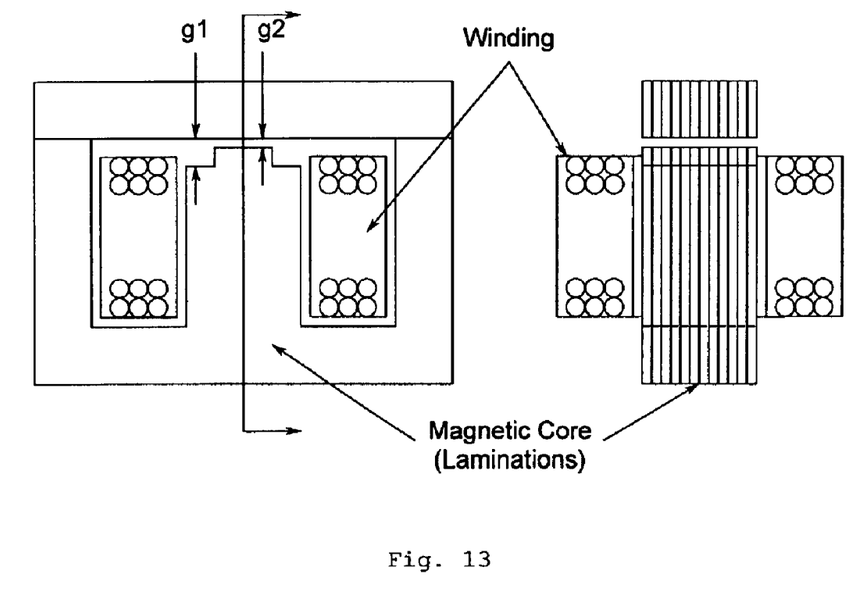
FIG. 13 shows a construction technique for making a non-linear inductor using E and I laminations.

FIG. 13 shows one of the two construction methods for the non-linear inductor of the present invention. As with the linear inductor of FIG. 12, the non-linear inductor of FIG. 13 uses a stack of E and I laminations 40 and 42, respectively and a winding 44 around the middle leg 40c of the E lamination 40.

The linear dc side inductor of FIG. 12 has a constant air gap width g1. Instead of that constant air gap width the air gap of the non-linear inductor of FIG. 13 has a step width g2 (where g2<g1) for a portion of the middle leg 40c of the E lamination 40. All of the E laminations 40 used in the construction of the non-linear dc side inductor have an identically cut step air gap. The proportion of the width of the middle leg 40c of the E lamination 40 that produces the smaller air gap g2 with lamination 42 can be varied to achieve the desired non-linearity effect. For example, the inductance versus current curve for the non-linear inductor shown in FIG. 7 was achieved by choosing the width of gap g2 to be equal to 25% of the width of gap g1 and the width of the small air gap g2 was 40% of the width of the middle leg 40c of the E lamination 40.

The non-linear behavior of the dc side inductor shown in FIG. 13 can be explained as follows. At low operating currents, the $\mu_r$ of the laminations 40, 42 is high and the inductance is dominated by the small air gap g2 and therefore the inductance value is high. As the operating current increases, the lamination material below the small air gap starts to saturate and $\mu_r$ decreases rapidly with the consequent rapid decrease in inductance that is shown in FIG. 7 for the non-linear inductor.

When such a non-linear inductor is used as the dc side filter inductor 12 in the rectifier circuit 10 of FIG. 1, the higher value of the inductance at low operating currents (partial load) produces a lower magnitude of the current ripple through the inductor, as shown in FIG. 10, when compared with the ripple produced by the linear inductor at partial load as shown in FIG. 5. This reduction in the ripple current is responsible for the lower harmonic currents due to the non-linear inductor at partial loads, as shown in Table 4, when compared with the harmonic currents produced by the linear inductor at partial loads shown in Table 2.

Figure 14:
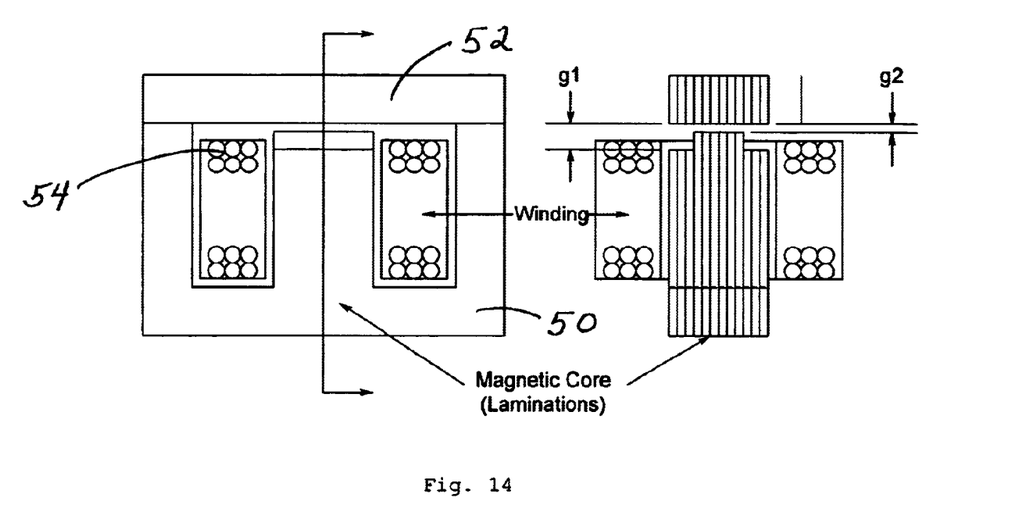
FIG. 14 shows another construction technique for making a non-linear inductor using E and I laminations.

FIG. 14 shows the second method to construct the non-linear inductor of the present invention. In this construction the middle leg 50c of some of the E laminations 50 have a constant width air gap g1 with lamination 52 and the middle leg 50c of the remainder of the E laminations 50 have a different value of constant width air gap g2 (where g2<g1) with lamination 52. The ratio of the number of laminations 50 with a middle leg 50c that has a small air gap with lamination 52 to those that have a big air gap with lamination 52 can be chosen to achieve the desired non-linear effect. The inductance versus current curve for the non-linear inductor shown in FIG. 7 was achieved by choosing that ratio to be equal to 2:3.

The small and big air gap laminations can be placed in different positions relative to each other. In the non-linear inductor of FIG. 14 they are shown with those laminations of the middle leg 50c that produces the smaller air gap with laminations 52 in the center of the entire stack. Another option is to reverse the arrangement where the big air gap laminations are in the center of the stack. Some other arrangements are: side-by-side positioning of small and big air gap laminations or dispersing small and big air gap laminations uniformly throughout the stack of E laminations 50.

While the constructions shown in FIGS. 13 and 14 for the non-linear inductor of the present invention uses a stack of E and I laminations with the air gap in the middle leg of the E lamination it should be appreciated that:

a) an air gap having the characteristics described above for the embodiments of FIGS. 13 and 14 may also be at either of both of end legs 40a and 40b for the embodiment of FIG. 13 and at either or both of end legs 50a and 50b for the embodiment of FIG. 14; and b) the non-linear inductor in both figures may also be embodied using for example only E laminations or using U shaped laminations and I laminations or using only U shaped laminations or any other shape or combination of shapes of laminations that allow for one or more gaps that have the characteristics described above for the embodiments of FIGS. 13 and 14.

Figure 15:
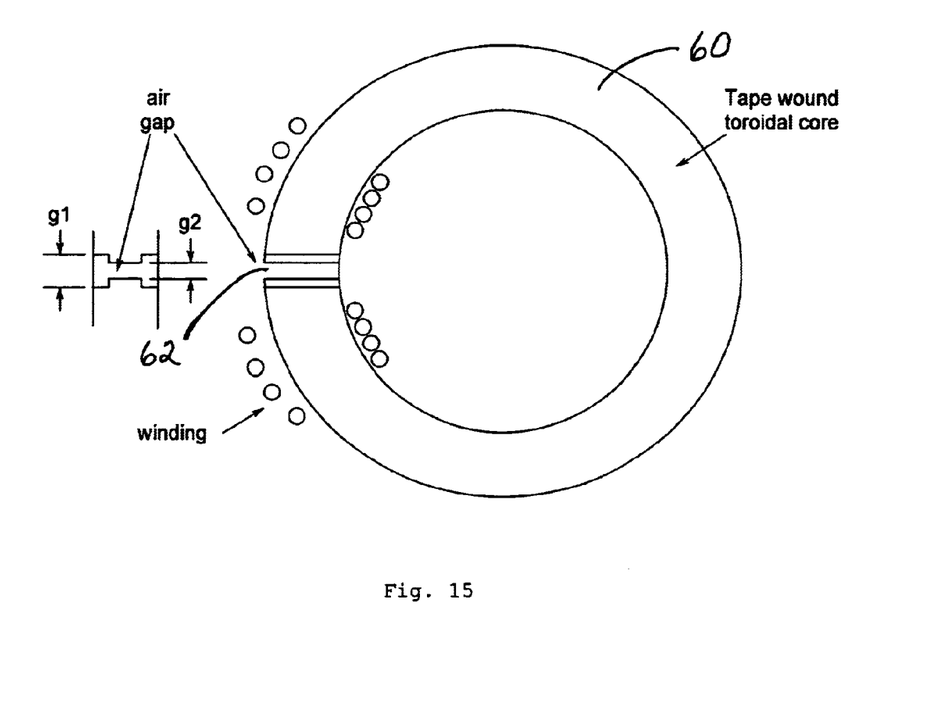
FIG. 15 shows a construction technique for making a dc side non-linear inductor in the form of a toroidal core.

FIG. 15 shows a construction method for a dc side non-linear inductor in the form of a toroidal core 60. In this construction a tape of a magnetic material is wound in a toroidal shape. An air gap 62 is introduced by cutting the core 60 in an axial direction. As shown in the FIG. 15, the larger air gap g1 is placed on the outer edge of the toroidal core 60 and smaller air gap g2 is placed in the middle of the toroidal core 60. In this sense, the construction of FIG. 15 is the toroidal equivalent of the stepped gap E-I construction of FIG. 13.

Figure 16:
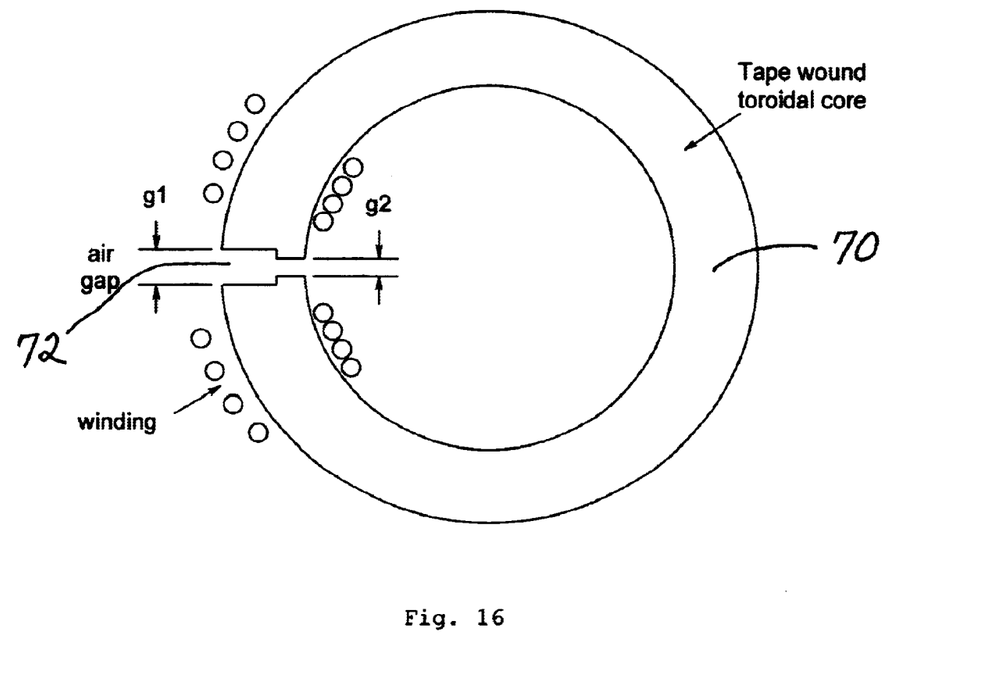
FIG. 16 shows another construction technique for making a dc side non-linear inductor in the form of a toroidal core.

FIG. 16 shows a construction method for a dc side non-linear inductor in the form of a toroidal core 70 which as is described below has an air gap that is different in construction than the air gap of toroidal core 60 of FIG. 15. In core 70 a tape of a magnetic material is wound in a toroidal shape. An air gap 72 is introduced by cutting core 70 in a radial direction. But instead of a constant air gap, the tape or "laminations" on the outside (diameter) of the toroidal core 70 have a bigger air gap (g1) than the air gap (g2) in the tape or "laminations" which are inside (diameter) the toroidal core 70. In this sense, the construction of FIG. 16 is the toroidal equivalent of the variable gap E-I construction of FIG. 14.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system comprising:

a rectifier having an input for connection to an ac source and an output; and an inductance-capacitance filter connected to said output of said rectifier where said inductance comprises one or more inductors designed to have an inductance that changes non-linearly over a predetermined range of operating current and harmonic currents drawn from said ac source both when a rated load and a partial load are connected to said rectifier that have a percent total harmonic distortion that is less than the percent total harmonic distortion when said inductance comprises one or more linear inductors.

2. The system of claim 1 wherein each of said one or more inductors has an inductance value at lower operating current that is higher than the inductor inductance value at a higher operating current.

3. A system comprising:

a rectifier having an input for connection to an ac source and an output;

one or more inductors designed to have an inductance that changes non-linearly over a predetermined range of operating current and harmonic currents drawn from said ac source both when a rated load and a partial load are connected to said rectifier that have a percent total harmonic distortion that is less than the percent total harmonic distortion when said inductance comprises one or more linear inductors connected between said input of said rectifier and said ac source; and a capacitor connected across said output of said rectifier.

4. The system of claim 3 wherein each of said one or more inductors has an inductance value at lower operating current that is higher than the inductor inductance value at a higher operating current.

* * * * *